US012759439B2

(12) United States Patent
Kee et al.

(10) Patent No.: US 12,759,439 B2
(45) Date of Patent: Oct. 13, 2026

(54) TILTABLE BACK FRAME

(71) Applicants: Hyundai Motor Company, Seoul (KR); Kia Corporation, Seoul (KR); Hyundai Transys Inc., Seosan-si (KR)

(72) Inventors: Nag Chool Kee, Hwaseong-Si (KR); In Ho Jung, Seoul (KR); Jong Hoon Moon, Seoul (KR); Dong Ho Shin, Yongin-Si (KR); Gwang Hyun Ahn, Yongin-Si (KR); Kyoung Sil Lee, Seoul (KR); Ha Kwon Bong, Hwaseong-Si (KR); Sung Kyung Hong, Hwaseong-Si (KR); Bo Ram Kim, Seoul (KR); Jae Ryong Won, Seoul (KR); Se Ho Kim, Seoul (KR); Ji Yun Seo, Hwaseong-Si (KR); Jae Hyun Seo, Hwaseong-Si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 105 days.

(21) Appl. No.: 18/895,010

(22) Filed: Sep. 24, 2024

(65) Prior Publication Data

US 2025/0222837 A1 Jul. 10, 2025

(30) Foreign Application Priority Data

Jan. 8, 2024 (KR) ........................ 10-2024-0002867

(51) Int. Cl.

*B60N 2/14* (2006.01)
*B60N 2/06* (2006.01)
*B60N 2/20* (2006.01)

(52) U.S. Cl.

CPC ............... *B60N 2/143* (2013.01); *B60N 2/06* (2013.01); *B60N 2/203* (2013.01)

(58) Field of Classification Search

CPC .......... B60N 2/143; B60N 2/203; B60N 2/06; B60N 2/1828

See application file for complete search history.

(56) References Cited

U.S. PATENT DOCUMENTS 250,597 A * 12/1881 St. John ................. B60N 2/203 297/396
613,423 A * 11/1898 Pickles .............. B61D 33/0028 297/103
629,258 A * 7/1899 Johnston ................ B60N 2/203 297/94

(Continued)

FOREIGN PATENT DOCUMENTS

FR 3089896 A1 * 6/2020 ............. B60N 2/203
GB 274679 A * 7/1927 ......... B61D 33/0028
KR 10-2023-0093585 6/2023

OTHER PUBLICATIONS

English translation for FR-3089896-A1 (Year: 2020).*

*Primary Examiner* — David R Dunn
*Assistant Examiner* — Troy Alan Libby
(74) *Attorney, Agent, or Firm* — MORGAN, LEWIS & BOCKIUS LLP

(57) ABSTRACT

A seat for mobility is configured for a seating direction of the seat to be changed, such that the convenience of use of the seat may be ensured, the weight and volume may be reduced by structural simplification, and the manufacturing costs may be reduced.

14 Claims, 17 Drawing Sheets

(56) References Cited

U.S. PATENT DOCUMENTS

| | | | | | |
|---|---|---|---|---|---|
| 656,188 | A * | 8/1900 | Hale | B60N 2/143 | 297/98 |
| 734,560 | A * | 7/1903 | Johnston | B60N 2/143 | 297/99 |
| 784,428 | A * | 3/1905 | Pickles | B60N 2/203 | 297/94 |
| 1,096,678 | A * | 5/1914 | Budd | B60N 2/1828 | 297/367 R |
| 1,196,908 | A * | 9/1916 | Walker | B61D 33/0028 | 297/97 |
| 1,228,785 | A * | 6/1917 | Kilburn | B60N 2/1828 | 297/99 |
| 1,240,244 | A * | 9/1917 | Ogle | B60N 2/203 | 297/97 |
| 1,252,748 | A * | 1/1918 | Walker | B60N 2/203 | 297/97 |
| 1,301,020 | A * | 4/1919 | Walker | B61D 33/0028 | 297/97 |
| 1,968,434 | A * | 7/1934 | Bell | B60N 2/203 | 297/103 |
| 5,322,341 | A * | 6/1994 | Harrison | B60N 2/203 | 297/94 |
| 7,644,982 | B2 * | 1/2010 | Paluch | B60N 2/853 | 297/94 |
| 11,479,157 | B2 * | 10/2022 | Vetere, II | B60N 2/203 | |
| 2019/0283640 | A1 * | 9/2019 | Vetere, II | B60N 2/753 | |

* cited by examiner

TILTABLE BACK FRAME

CROSS-REFERENCE TO RELATED APPLICATION

The present application claims priority to Korean Patent Application No. 10-2024-0002867, filed on Jan. 8, 2024, the entire contents of which is incorporated herein for all purposes by this reference.

BACKGROUND OF THE PRESENT DISCLOSURE

Field of the Present Disclosure

The present disclosure relates to a seat for mobility, which is capable of changing in seating directions.

Description of Related Art

Mobility vehicles including vehicles, in which occupants are seated, are provided with seats to ensure convenience for the occupants. The seat allows the occupant to be seated in a comfortable posture so that the occupant does not get tired even on long trips.

The seat is fixed in position in a cabin, and the occupant needs to manually adjust positions of a cushion and a seatback.

Recently, purpose-built vehicles (PBVs) have been developed as an electric vehicle-based ground transportation means. The PBVs are moved by electric wheels that move freely in 360 degrees instead of the wheels of a vehicle. The PBVs are not only used as a means of transportation, but also to provide personalized services to passengers as they travel to their destination. The personalized design of the PBVs means that they can function as city shuttles, provide leisure spaces such as restaurants, cafes, and hotels, and may be transformed into various spaces such as hospitals, pharmacies, and other socially essential facilities. To the present end, an interior of a vehicle body may be customized by use of products modularized to suit the purpose thereof.

However, because the internal space needs to be customized for various purposes of use, it is necessary to change seating directions of seats.

However, because the seats are fixed in position, it is inconvenient to detach the seats to change the positions of the seats.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat for mobility, in which a seating direction of the seat may be changed so that the convenience of use of the seat may be ensured, the weight and volume may be reduced by structural simplification, and the manufacturing costs may be reduced.

To achieve the above-mentioned object, the present disclosure provides a seat for mobility, the seat including: guide rails provided on a floor surface of the mobility; support portions movably mounted on the guide rails; link portions rotatably provided on the support portions, spaced apart from a rotation center, and including first connection portions and second connection portions; a back frame tiltably mounted on the support portions and including first operation portions to which the first connection portions of the link portions are rotatably engaged; and a cushion frame rotatably mounted on the support portions and including second operation portions to which the second connection portions of the link portions are rotatably engaged, the cushion frame being configured to be rotated by the link portions in conjunction with a tilting operation of the back frame.

The back frame may be disposed on external surfaces of the support portions, the cushion frame may be disposed on internal surfaces of the support portions, the link portions may be provided on the external surfaces of the support portions, the first connection portions may extend outward and be connected to the first operation portions of the back frame, and the second connection portions may extend inward and be connected to the second operation portions of the cushion frame.

A lower portion of the back frame may be rotatably provided on the support portion and disposed below the link portion, and the first operation portion may be provided to be spaced apart from a point at which the back frame is provided on the support portion.

A point at which the cushion frame is provided on the support portion may be disposed to be biased toward any one side in a longitudinal direction, and the second operation portion may be spaced apart from the point, at which the cushion frame is mounted on the support portion, in a direction in which a length of a seat frame is short, based on the point at which the cushion frame is provided on the support portion as the point at which the cushion frame is provided on the support portion is biased.

The first connection portion, the first operation portion, the second connection portion, and the second operation portion may be configured as protrusions or slits and define insertion structures.

Each of the slits related to the first connection portion, the first operation portion, the second connection portion, and the second operation portion may extend to define a movement route of a corresponding one of the protrusions.

In the slits related to the first connection portion, the first operation portion, the second connection portion, and the second operation portion, in a state in which the back frame and the cushion frame are rotated on lines perpendicular to an upward/downward direction, the protrusions of the first connection portion and the first operation portion may be positioned at uppermost end portions of the slits, and the protrusions of the second connection portion and the second operation portion may be positioned at lowermost end portions of the slits.

A first end portion of the link portion may be rotatably provided on the support portion, the first connection portion and the second connection portion may be sequentially spaced apart from each other toward a second end portion opposite to the first end portion, a length of the slit of each of the first connection portion and the first operation portion may be shorter than a length of the slit of each of the second connection portion and the second operation portion so that a rotation amount of the cushion frame may be greater than a tilting amount of the back frame.

The back frame may be rotatably provided on the support portion by a recliner.

The support portion may be provided with a stopper to restrict a rotation position of the link portion, and the stopper may be formed at a position at which the stopper comes into contact with the link portion when the cushion frame rotates at a deployment angle at which an occupant is seated.

A latch may be provided on the cushion frame, and the latch may be provided to be connected to the link portion when the cushion frame rotates at a deployment angle at which an occupant is seated.

A headrest may be provided on an upper portion of the back frame, and the headrest may be rotatably provided on the back frame.

The cushion frame may be divided into a plurality of cushion frames, any one cushion frame may be provided on the support portion, and the remaining cushion frames may be rotatably engaged to the cushion frame provided on the support portion.

According to the seat for mobility structured as described above, the seating direction of the seat may be changed so that the convenience of use of the seat may be ensured, the weight and volume may be reduced by structural simplification, and the manufacturing costs may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
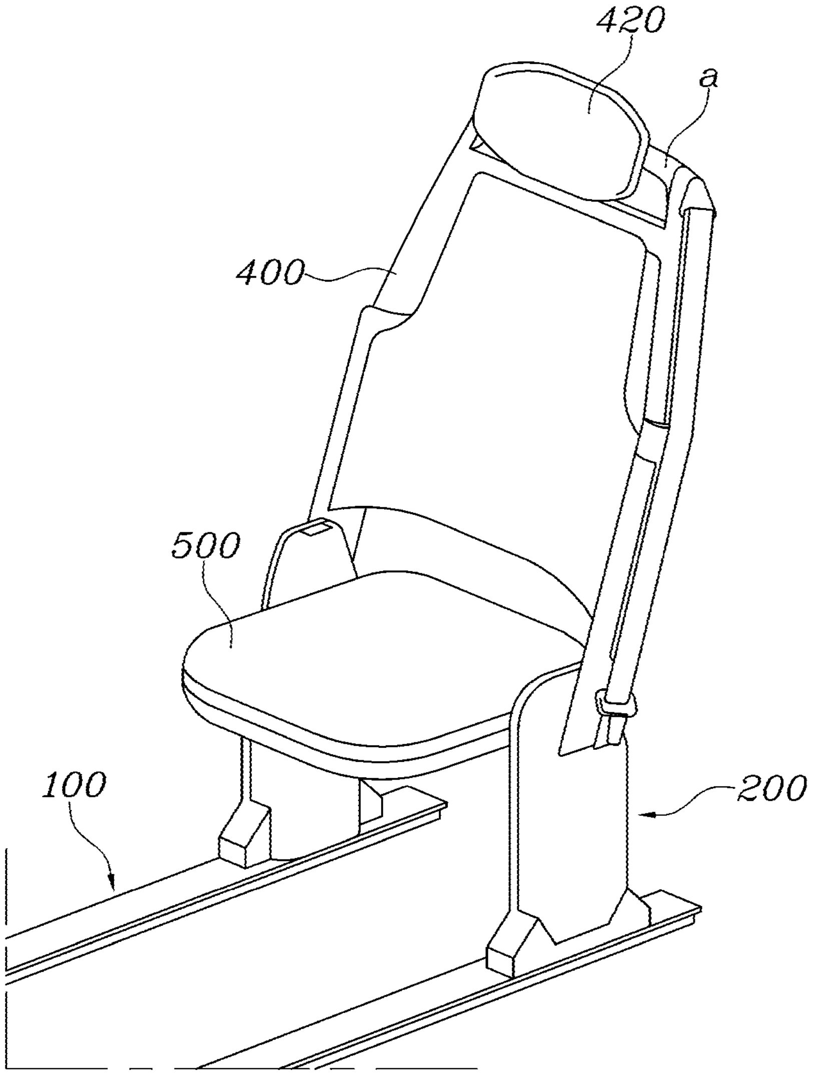
FIG. 1 is a view exemplarily illustrating a seat for mobility according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes “module”, “unit”, “part”, and “portion” used to describe constituent elements in the following description are used together or interchangeably to facilitate the description, but the suffixes themselves do not have distinguishable meanings or functions.

In the description of the exemplary embodiments disclosed in the present specification, the specific descriptions of publicly known related technologies will be omitted when it is determined that the specific descriptions may obscure the subject matter of the exemplary embodiments disclosed in the present specification. Furthermore, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, a seat for mobility according to an exemplary embodiment of the present disclosure will be described with reference to the accompanying drawings. Furthermore, the term 'mobility' may be referred to a mobility vehicle for helping the understanding of the present disclosure hereinafter, as an example.

As illustrated in FIG. 1, FIG. 2, FIG. 3, FIG. 4, FIG. 5 and FIG. 6, the seat for mobility according to an exemplary embodiment of the present disclosure includes guide rails 100 provided on a floor surface, support portions 200 movably mounted on the guide rails 100, link portions 300 rotatably provided on the support portion 200, and including first connection portions 310 and second connection portions 320 spaced apart from a rotation center 330 of link portions 300, a back frame 400 tiltably provided on the support portions 200 and including first operation portions 410 to which the first connection portions 310 of the link portions 300 are rotatably engaged, and a cushion frame 500 rotatably provided on the support portions 200 and including second operation portions 510 to which the second connection portions 320 of the link portions 300 are rotatably engaged, the cushion frame 500 being configured to be rotated by the link portions 300 in conjunction with a tilting operation of the back frame 400.

The guide rail 100 is fixed to the floor surface of the internal and extends in a straight or curved shape to provide a movement route of the support portion 200.

The support portion 200 is slidably connected to the guide rail 100. A seat rail structure may be applied as the support portion 200. Therefore, a movement position of the support portion 200 may change along the guide rail 100. A position of the moved support portion 200 may be fixed by a locking structure included in the seat rail structure. Because the seat rail structure is a typical technology, a detailed description of the structure thereof will be omitted.

According to an exemplary embodiment of the present disclosure, the back frame 400 and the cushion frame 500 are provided on the support portions 200. The back frame 400 and the cushion frame 500 are connected by the link portion 300 and operate in conjunction with each other.

The link portion 300 is rotatably provided on the support portion 200 and includes the first connection portion 310 and the second connection portion 320.

The back frame 400 may be rotatably and hingedly connected to the support portion 200 and connected to the first connection portion 310 of the link portion 300 through the first operation portion 410. In an exemplary embodiment of the present disclosure, the seat is configured so that an occupant may be seated in the seat in a forward/rearward direction thereof. Therefore, pads may be applied to the front and rear surfaces of the back frame 400.

The cushion frame 500 may be rotatably and hingedly connected to the support portion 200 and connected to the second connection portion 320 of the link portion 300 through the second operation portion 510. In an exemplary embodiment of the present disclosure, the seat is configured so that the occupant may be seated in the seat in the forward/rearward direction thereof. Therefore, pads may be applied to the two opposite surfaces of the cushion frame 500.

As described above, the first connection portion 310 of the link portion 300 is connected to the first operation portion 410, and the second connection portion 320 of the link portion 300 is connected to the second operation portion 510 so that the back frame 400 and the cushion frame 500 may simultaneously rotate in conjunction with the rotation of the link portion 300 when the back frame 400 or the cushion frame 500 rotates.

As described above, according to an exemplary embodiment of the present disclosure, the state in which the occupant may seated in the seat in the two directions may be implemented by the conjunction structure between the back frame 400 and the cushion frame 500 by the link portion 300 so that the convenience of accommodation and use of the seat may be ensured.

According to an exemplary embodiment of the present disclosure, the back frame 400 may be disposed on an external surface of the support portion 200, the cushion frame 500 may be disposed on an internal surface of the support portion 200, the link portion 300 may be provided on the external surface of the support portion 200, the first connection portion 310 may extend outward and be connected to the first operation portion 410 of the back frame 400, and the second connection portion 320 may extend inward and be connected to the second operation portion 510 of the cushion frame 500.

Figure 3:
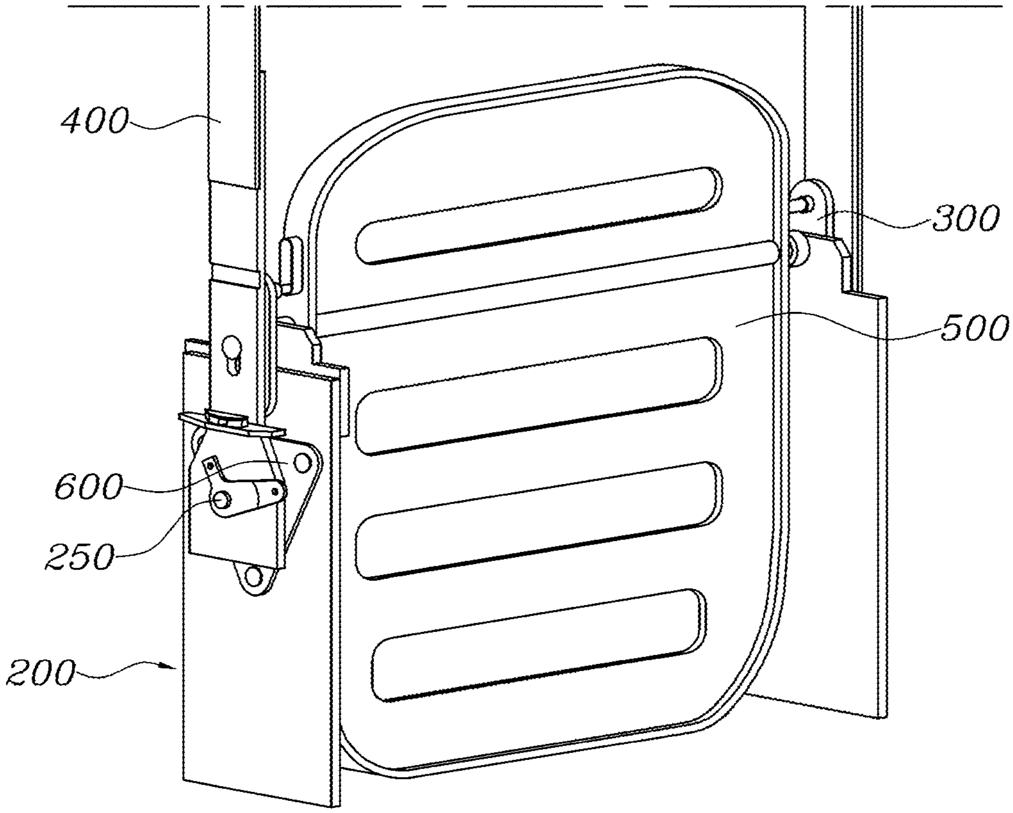
FIG. 3 is a view exemplarily illustrating a cushion frame and a back frame connected to a support in the seat for mobility illustrated in FIG. 1.
Figure 4:
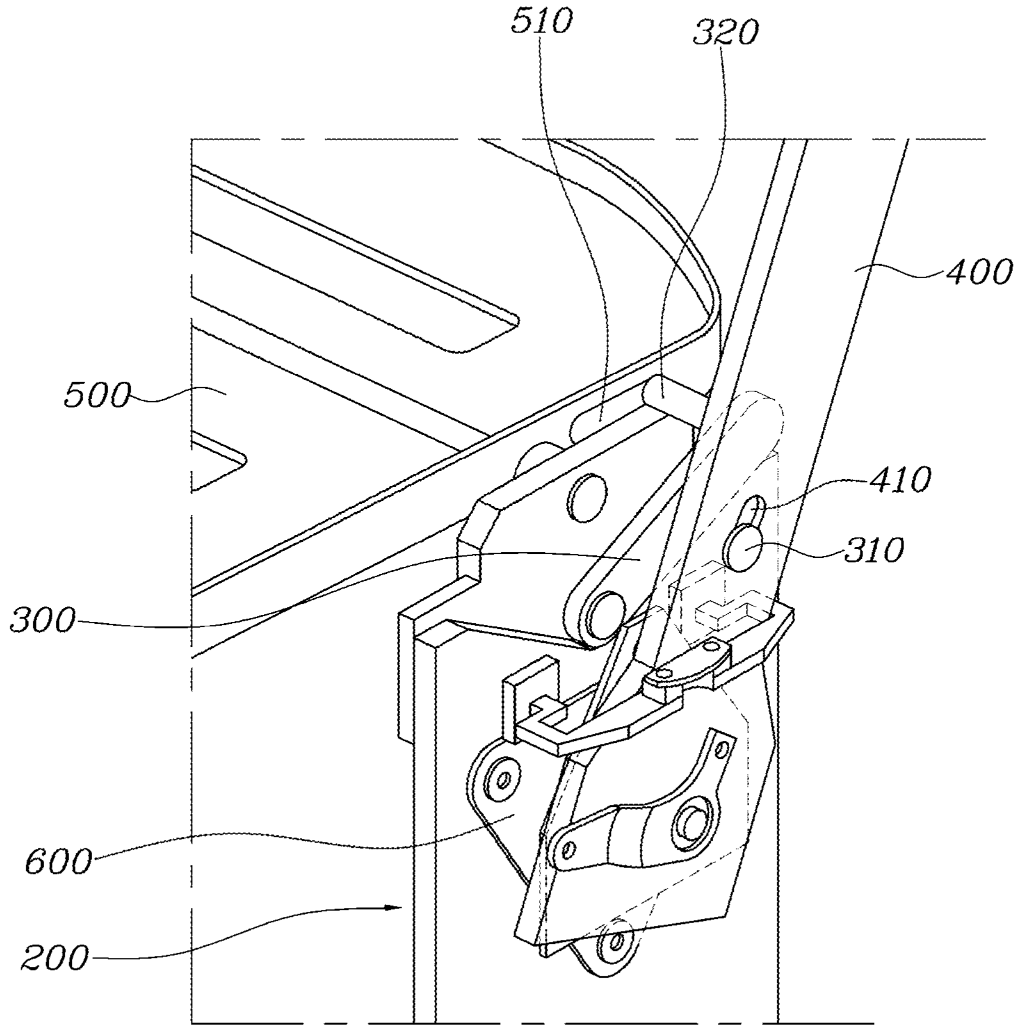
FIG. 4 is a view exemplarily illustrating the connection between the back frame and the cushion frame by a link portion in the seat for mobility illustrated in FIG. 1.

As illustrated in FIG. 3, according to an exemplary embodiment of the present disclosure, the back frame 400 and the cushion frame 500 are provided on the support portion 200. In the instant case, the support portions 200 may be provided as a pair of support portions 200, a pair of end portions of the back frame 400 is provided on the external surfaces of the two support portions 200, and the cushion frame 500 may be disposed inside the two support portions 200 and provided on the internal surfaces of the support portions 200. Therefore, the back frame 400 and the cushion frame 500 may be provided on the support portions 200 without interfering with each other.

The link portions 300 may be respectively provided on the two support portions 200 and connected to the back frame 400 and the cushion frame 500.

Therefore, the first connection portion 310 of the link portion 300 extends outward and is connected to the first operation portion 410 of the back frame 400, and the second connection portion 320 extends inwardly, at a position at which the second connection portion 320 does not interfere with the support portion 200, and is connected to the second operation portion 510 of the cushion frame 500.

Therefore, the back frame 400 and the cushion frame 500 may be connected by the link portion 300 to operate in conjunction with each other so that the back frame 400 and the cushion frame 500 may rotate simultaneously.

Meanwhile, a lower portion of the back frame 400 may be rotatably provided on the support portion 200 to be disposed below the link portion 300, and the first operation portion 410 may be provided to be spaced apart from a point at which the support portion 200 is provided.

As illustrated in FIG. 3, FIG. 4, FIG. 5 and FIG. 6, the lower portion of the back frame 400 is rotatably and hingedly connected to the support portion 200, and a point 250 to which the support portion 200 is connected may be positioned below the link portion 300. Therefore, when the back frame 400 rotates, the link portion 300 may rotate along a rotation radius of the back frame 400, and the cushion frame 500 may also be rotated by the link portion 300.

Furthermore, the first operation portion 410 may be positioned to be spaced apart from the point 250, at which the back frame 400 is mounted on the support portion 200, to be connected to the first connection portion 310 of the link portion 300 so that the link portion 300 may be rotated by the rotation of the back frame 400 while including the same rotation radius.

Meanwhile, as may be seen from FIG. 3, a point 550 at which the cushion frame 500 is provided on the support portion 200 may be disposed to be biased toward any one side in a longitudinal direction, and the second operation portion 510 may be spaced apart from the point 550, at which the cushion frame 500 is provided on the support portion 200, in a direction in which a length of a seat frame is short, based on the point 550 at which the cushion frame 500 is provided on the support portion 200 as the point 550 at which the cushion frame 500 is provided on the support portion 200 is biased.

Because the point 550 at which the cushion frame 500 is provided on the support portion 200 is disposed to be biased as described above, the cushion frame 500 is divided into a seating surface with a large area and a seating surface with a relatively small area. In the instant case, the seating direction of the cushion frame 500 may be changed in accordance with a position at which the seating surface with the large area is deployed so that the occupant may be seated on the seating surface with the large area.

The second operation portion 510 is formed at a side of the seating surface with the small area of the cushion frame 500 in a direction in which a length of the cushion frame 500 is short. Therefore, the cushion frame 500 may rotate in conjunction with the rotation of the link portion 300 so that the occupant may be seated on the seating surface with the large area, and the link portion 300 does not interfere with the occupant.

Therefore, the direction of the seating surface with the large area of the cushion frame 500 may be changed in accordance with the direction in which the cushion frame 500 rotates in conjunction with the rotations of the back frame 400 and the link portion 300 so that the seating direction may be selectively changed between the two directions.

Meanwhile, the first connection portion 310, the first operation portion 410, the second connection portion 320, and the second operation portion 510 may be respectively configured as protrusions or slits and define insertion structures.

That is, the connection structures between the first connection portion 310 and the first operation portion 410 and the connection structures between the second connection portion 320 and the second operation portion 510 are connected to one another by the structure in which the protrusion is inserted into the slit. Therefore, the back frame 400 and the cushion frame 500 as the protrusion rotates and moves in the slit.

In the description of the present disclosure, the first connection portion 310 and the second connection portion 320 of the link portion 300 are configured as protrusions, and the first operation portion 410 of the back frame 400 and the second operation portion 510 of the cushion frame 500 are configured as slits. Of course, the first connection portion 310 and the second connection portion 320 may be configured as slits, and the first operation portion 410 and the second operation portion 510 may be configured as protrusions. The same operational principle may be applied.

Each of the slits related to the first connection portion 310, the first operation portion 410, the second connection portion 320, and the second operation portion 510 may extend to define a movement route of the protrusion.

In an exemplary embodiment of the present disclosure, the first operation portion 410 and the second operation portion 510 may be configured as slits, the first operation portion 410 extends in a longitudinal direction of the back frame 400, and the second operation portion 510 extends in a longitudinal direction of the cushion frame 500.

Therefore, in a state in which the first connection portion 310, which is configured as a protrusion, is inserted into the first operation portion 410, the back frame 400 may also rotate along the rotation radius of the link portion 300, and the tilting position of the back frame 400 may be changed in accordance with the position at which the protrusion moves in the slit.

Furthermore, in a state in which the second connection portion 320, which is configured as a protrusion, is inserted into the second operation portion 510, the cushion frame 500 may also rotate along the rotation radius of the link portion 300, and the rotation position of the cushion frame 500 may be changed in accordance with the position at which the protrusion moves in the slit.

In the case of the slit related to the first connection portion 310, the first operation portion 410, the second connection portion 320, and the second operation portion 510, in the state in which the back frame 400 and the cushion frame 500 are rotated on the lines perpendicular to the upward/downward direction, the protrusions of the first connection portion 310 and the first operation portion 410 may be positioned at uppermost end portions of the slits, and the protrusions of the second connection portion 320 and the second operation portion 510 may be positioned at lowermost end portions of the slits.

Figure 8:
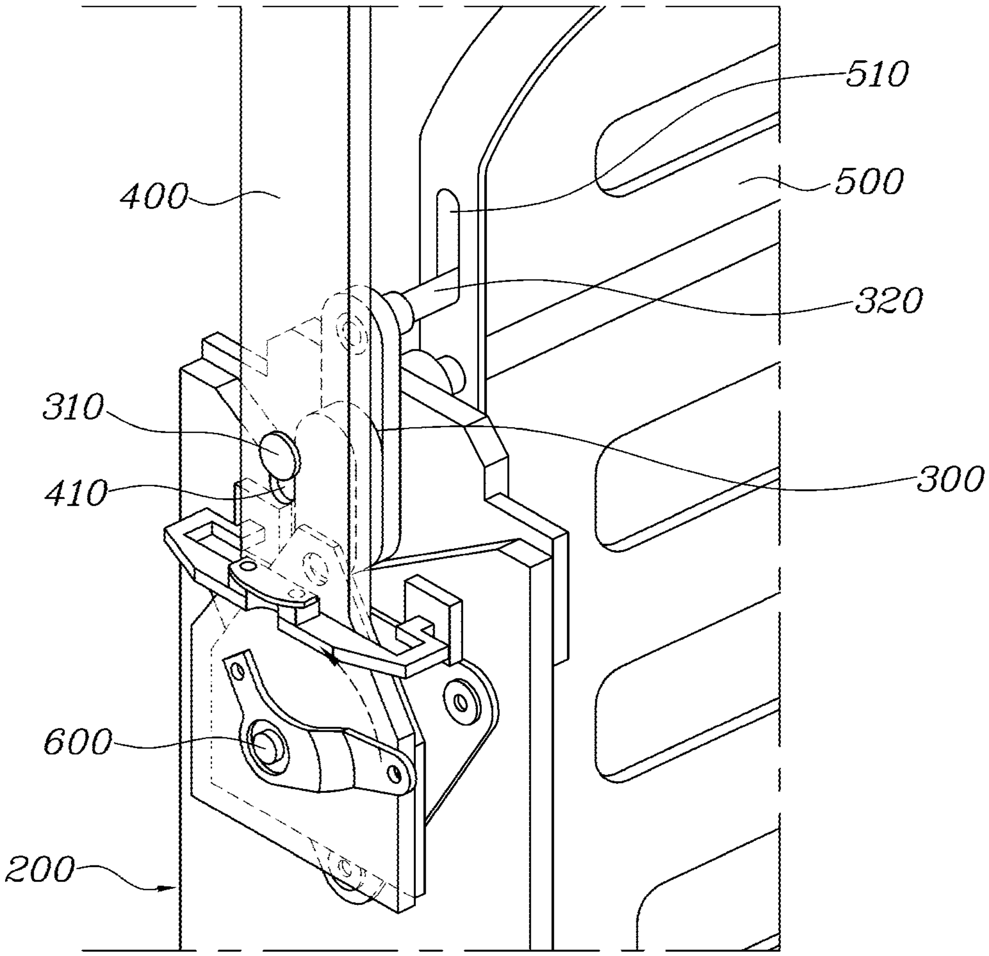
FIG. 8 is a view exemplarily illustrating a position of the link portion with respect to positions of the back frame and the cushion frame in FIG. 7.
Figure 9:
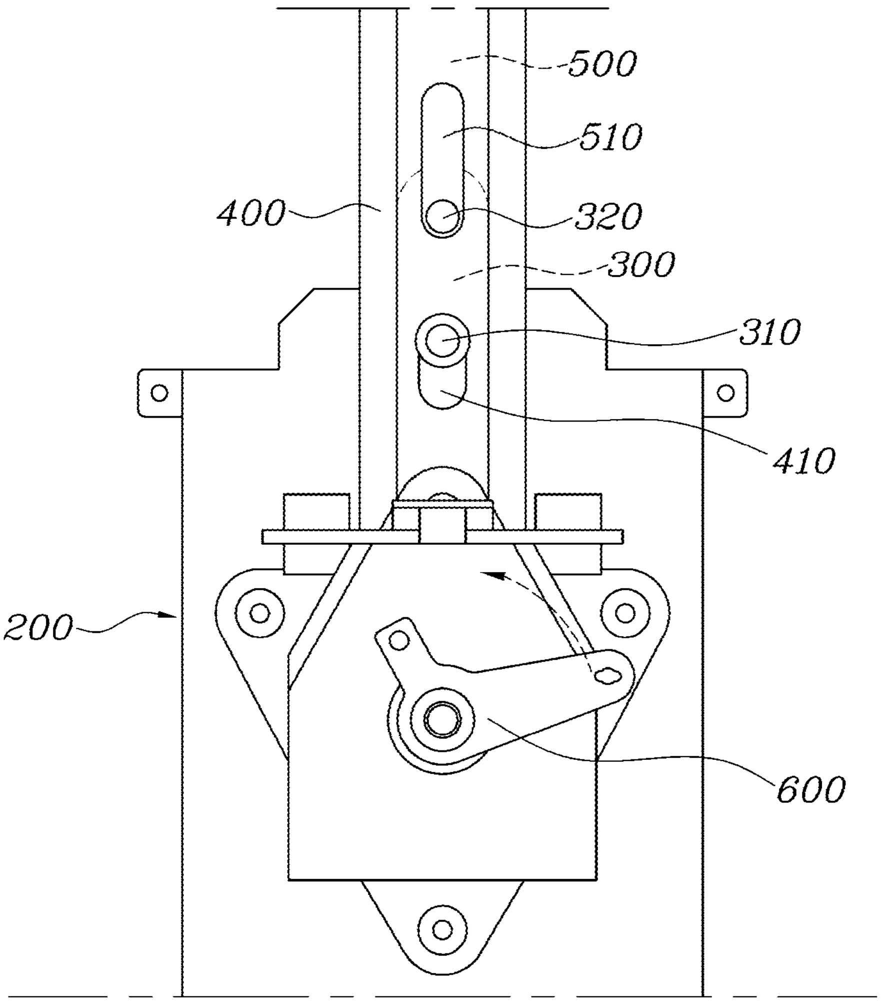
FIG. 9 is a side view exemplarily illustrating the position of the link portion with respect to the positions of the back frame and the cushion frame in FIG. 7.

With reference to FIG. 8 and FIG. 9, in the accommodation state in which the back frame 400 and the cushion frame 500 are rotated on the lines perpendicular to the upward/downward direction, the first connection portion 310, which is the protrusion, is positioned at the uppermost end portion of the first operation portion 410, which is the slit, and the second connection portion 320, which is the protrusion, is positioned at the lowermost end portion of the second operation portion 510 which is the slit so that the back frame 400 and the cushion frame 500 may rotate in opposite directions.

Furthermore, one end portion of the link portion 300 is rotatably provided on the support portion 200, and the first connection portion 310 and the second connection portion 320 are sequentially spaced apart from each other toward the other end portion. Therefore, when the link portion 300 rotates about a rotation center 330, the rotation radius of the second connection portion 320 may be ensured to be greater than the rotation radius of the first connection portion 310. In the instant case, in the accommodation state of the back frame 400 and the cushion frame 500, one direction of the link portion 300 may be a downward direction, and the other direction of the link portion 300 may be an upward direction thereof.

Therefore, a length of the slit of each of the first connection portion 310 and the first operation portion 410 is shorter than a length of the slit of each of the second connection portion 320 and the second operation portion 510 so that the rotation amount of the cushion frame 500 may be greater than the tilting amount of the back frame 400.

That is, the length of the first operation portion 410, which is configured as the slit, is configured as a relatively short length in accordance with the movement amount of the first connection portion 310 that moves along a relatively small rotation radius so that a tilting angle of the back frame 400 may be changed to support the occupant's back.

Furthermore, the length of the second operation portion 510, which is configured as the slit, is configured as a relatively long length in accordance with the movement amount of the second connection portion 320 that moves along a relatively large rotation radius so that an angle of the cushion frame 500 may be changed so that the occupant may be seated on the cushion frame 500 in a state in which the cushion frame 500 stands upright.

As described above, according to an exemplary embodiment of the present disclosure, the rotation amounts of the back frame 400 and the cushion frame 500 may be set based on the positions of the first connection portion 310 and the second connection portion 320, which form the link portion 300, and the lengths of the second operation portion 510 and the first operation portion 410. Therefore, the back frame 400 and the cushion frame 500 may be implemented as the seat in which the occupant may be seated.

The operation of the present disclosure may be performed as follows.

Figure 7:
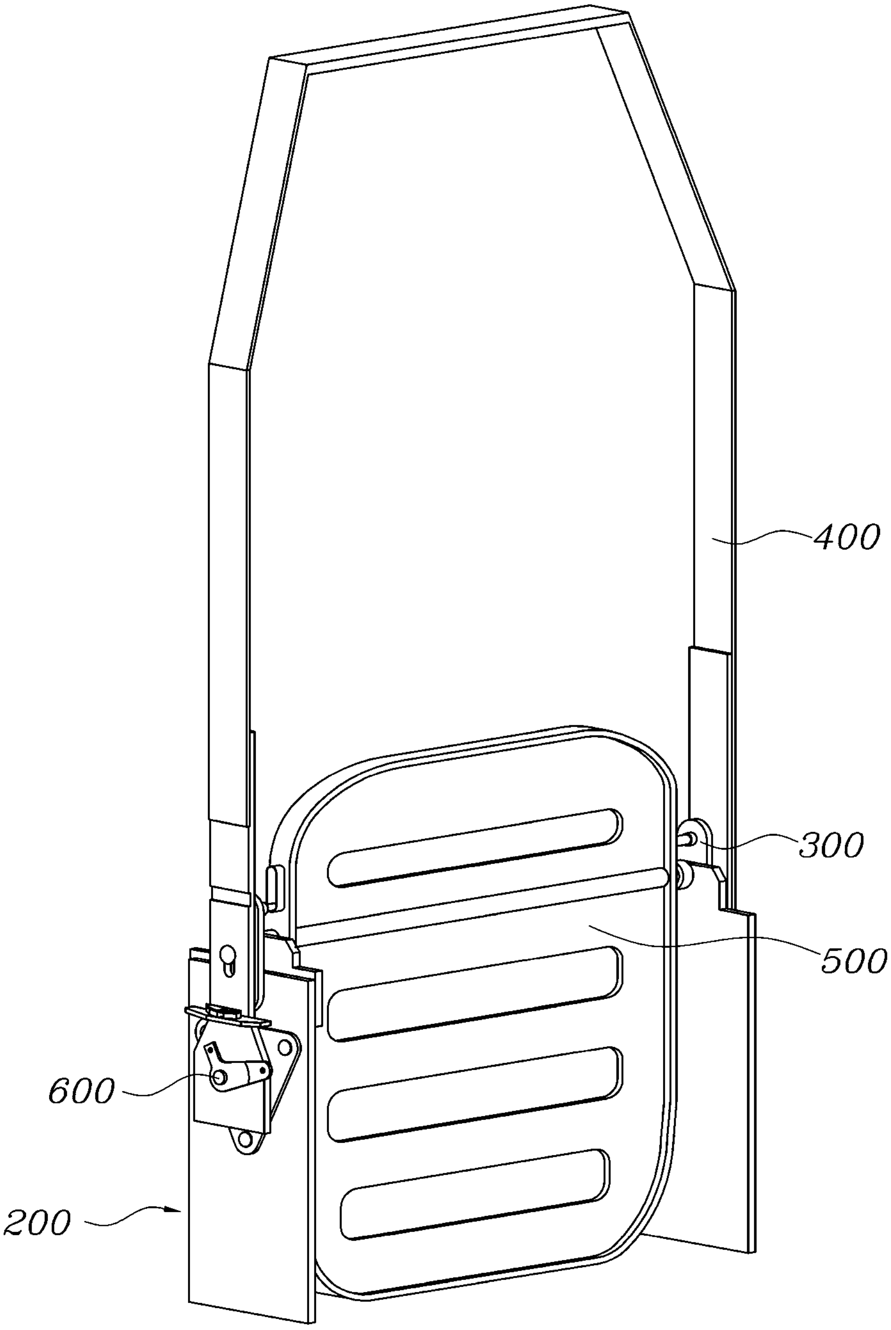
FIG. 7 is a view exemplarily illustrating a state in which the back frame and the cushion frame are positioned to stand upright in the seat for mobility illustrated in FIG. 1.

In the accommodation state in which the back frame 400 and the cushion frame 500 are deployed on the perpendicular line as illustrated in FIG. 7, the first connection portion 310, which is the protrusion, is positioned at the uppermost end portion of the first operation portion 410, which is the slit, and the second connection portion 320, which is the protrusion, is positioned at the lowermost end portion of the second operation portion 510, which is the slit, as illustrated in FIG. 8 and FIG. 9.

Figure 10:
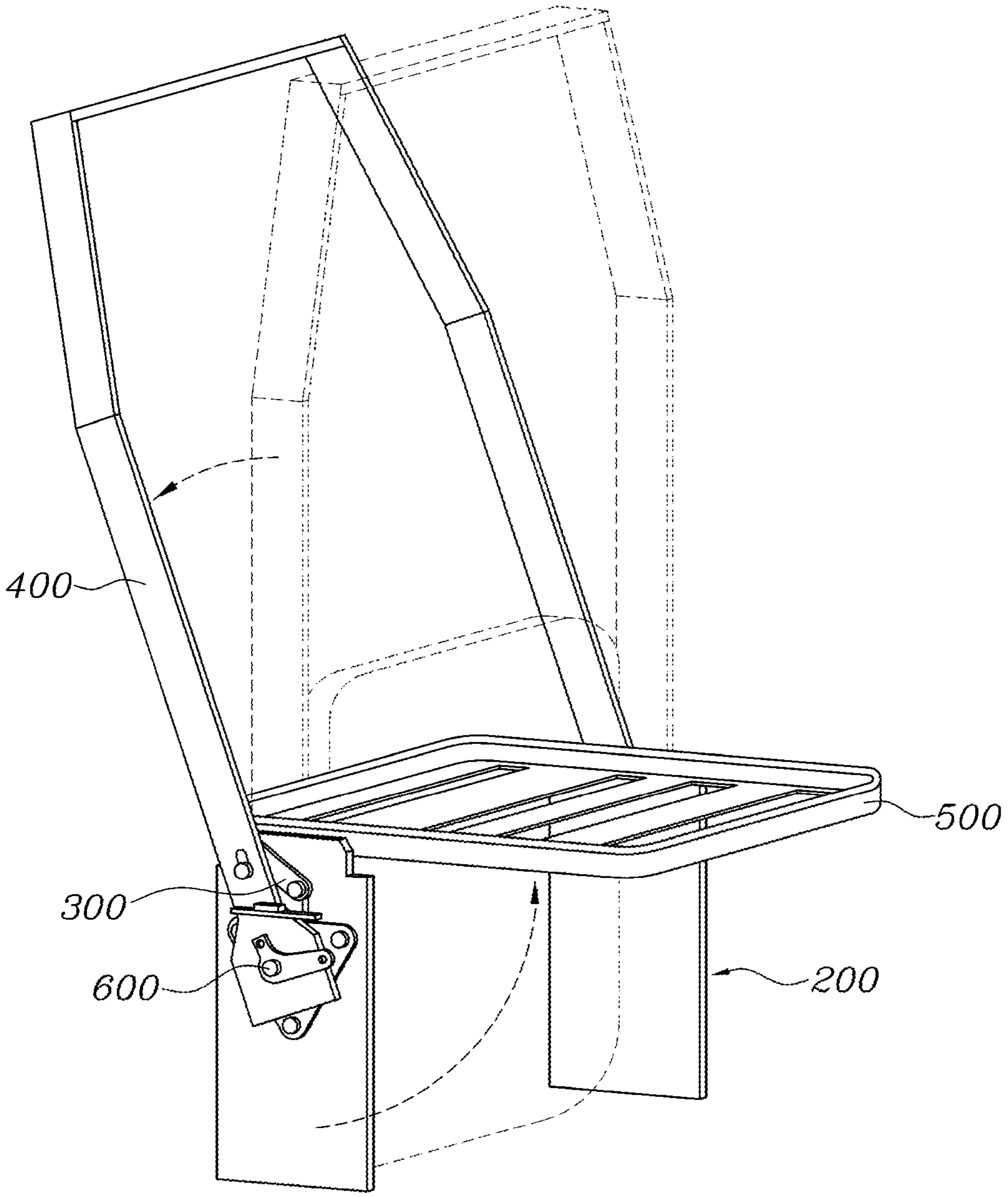
FIG. 10 is a view exemplarily illustrating a state in which the directions of the back frame and the cushion frame are changed to any one direction in the seat for mobility illustrated in FIG. 1.
Figure 11:
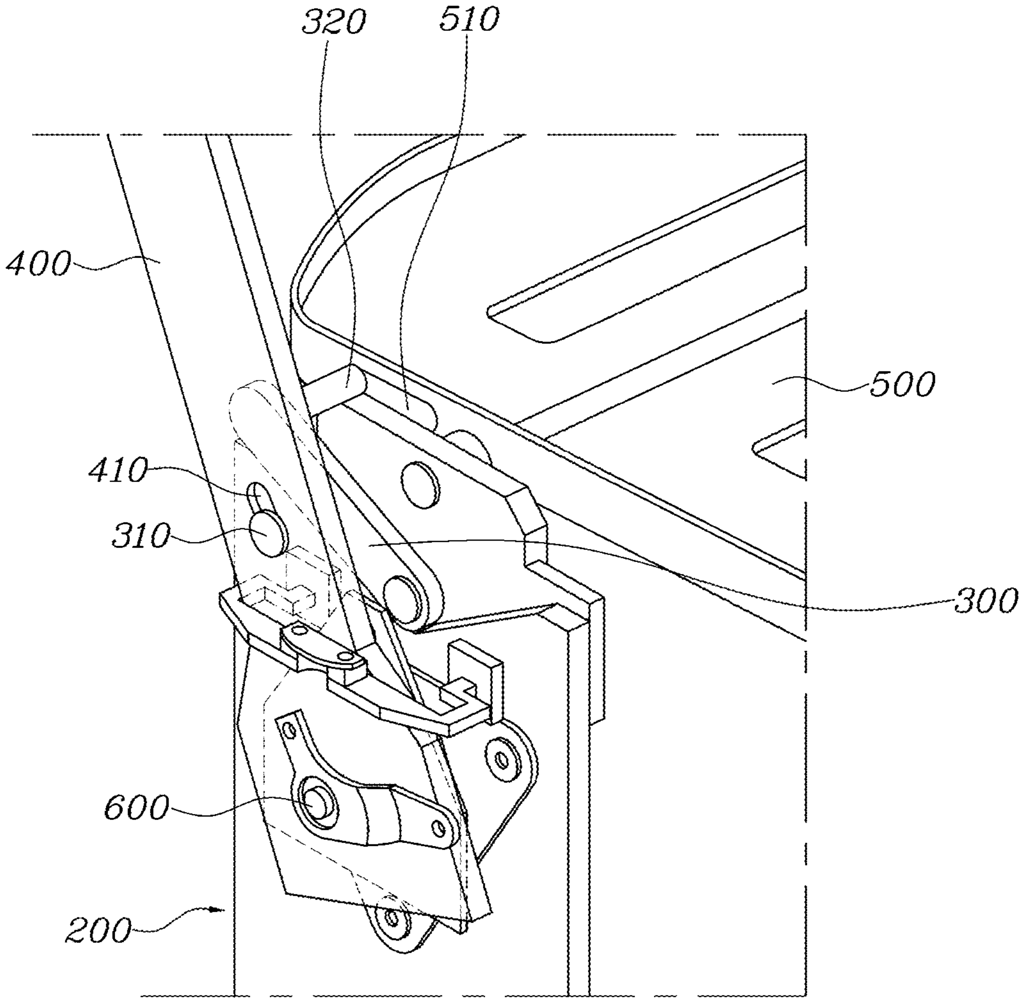
FIG. 11 is a view exemplarily illustrating a position of the link portion with respect to positions of the back frame and the cushion frame in FIG. 10.
Figure 12:
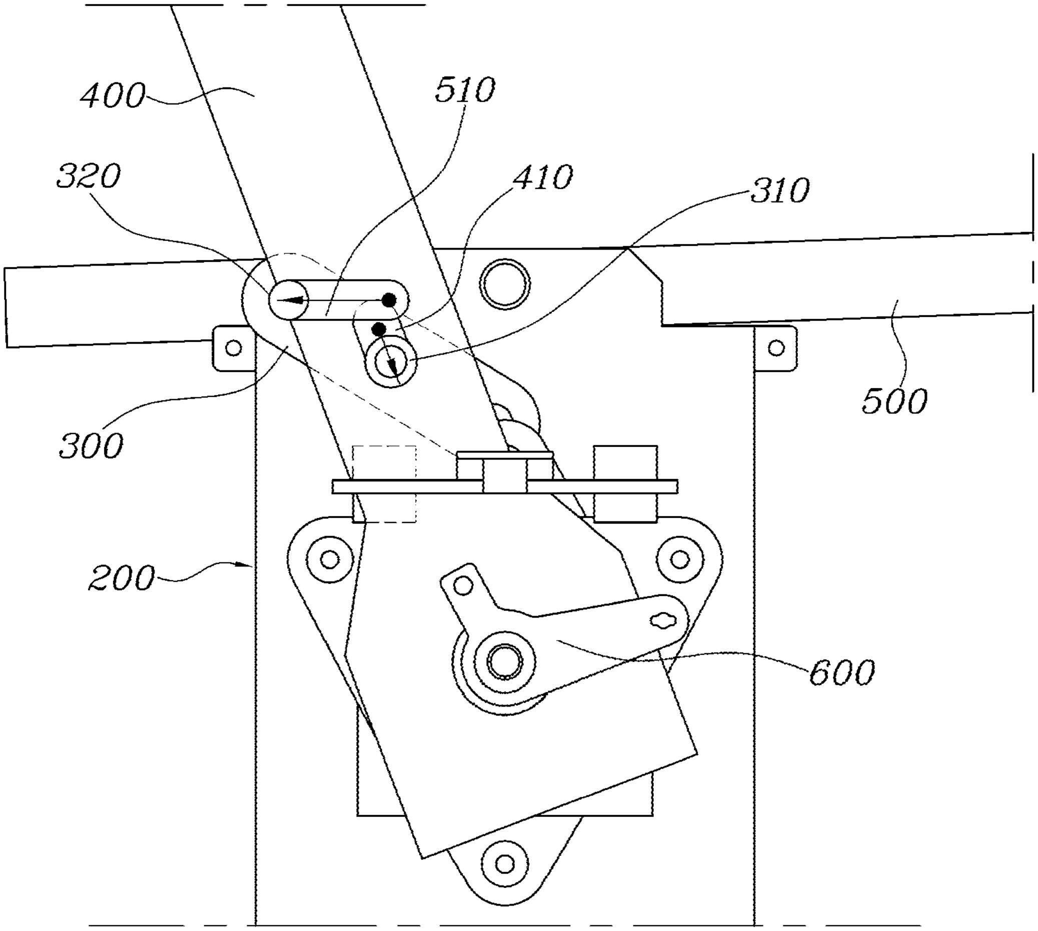
FIG. 12 is a side view exemplarily illustrating the position of the link portion with respect to the positions of the back frame and the cushion frame in FIG. 10.

In the instant case, when the back frame 400 rotates in any one direction as illustrated in FIG. 10, the first connection portion 310, which is the protrusion, moves downwardly in the opposite direction in the first operation portion 410, which is the slit, in accordance with the rotation of the back frame 400, as illustrated in FIG. 11 and FIG. 12. At the same time, when the first connection portion 310 moves in the first operation portion 410, the link portion 300 rotates, and the second connection portion 320, which is the protrusion, moves in the opposite direction in the second operation portion 510, which is the slit so that the cushion frame 500 rotates.

Therefore, during the tilting operation of the back frame 400, the cushion frame 500 rotates in conjunction with the back frame 400 by the link portion 300 so that the back frame 400 and the cushion frame 500 may be switched to the state in which the occupant may be seated.

Figure 13:
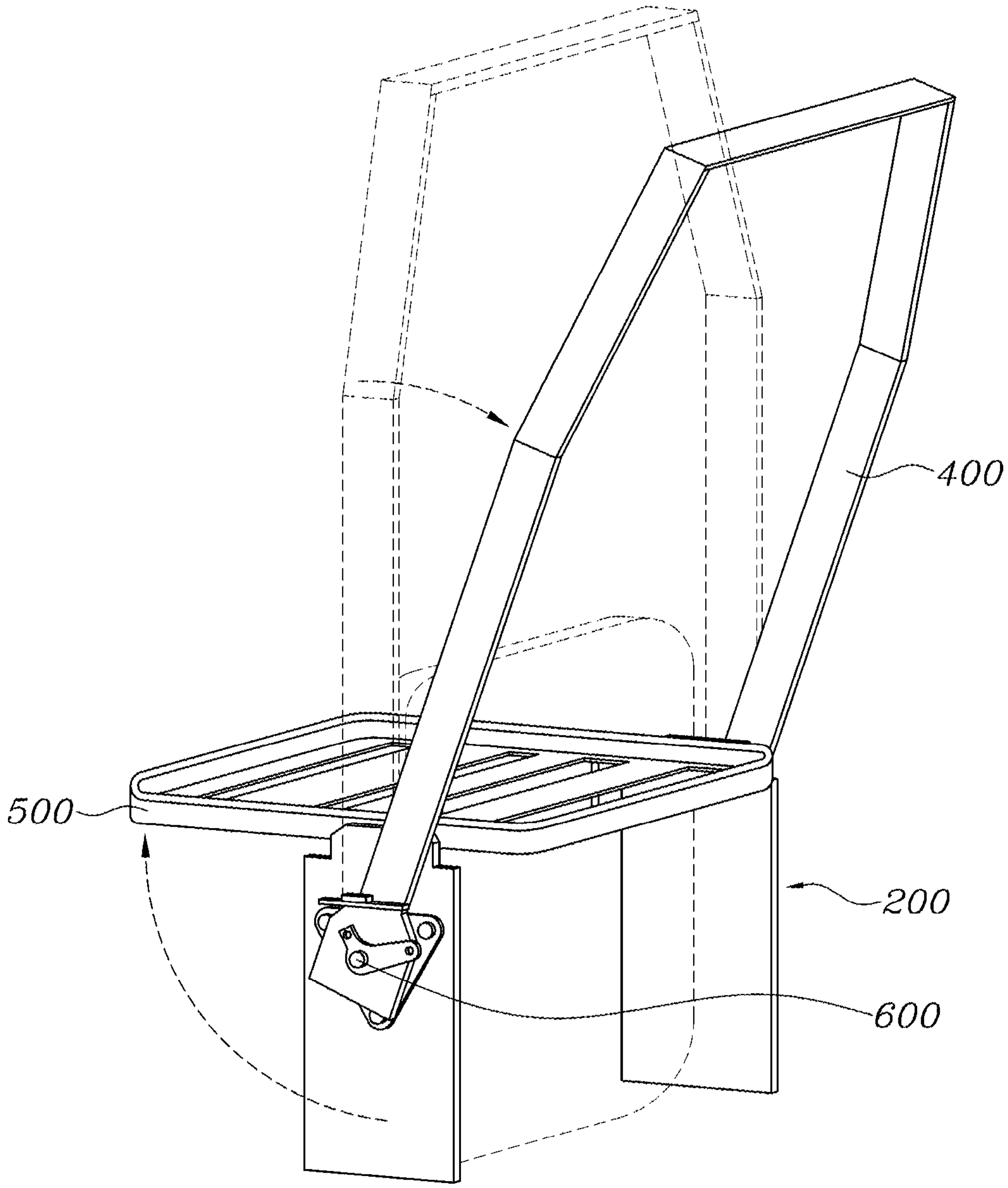
FIG. 13 is a view exemplarily illustrating a state in which the directions of the back frame and the cushion frame are changed to another direction in the seat for mobility illustrated in FIG. 1.
Figure 14:
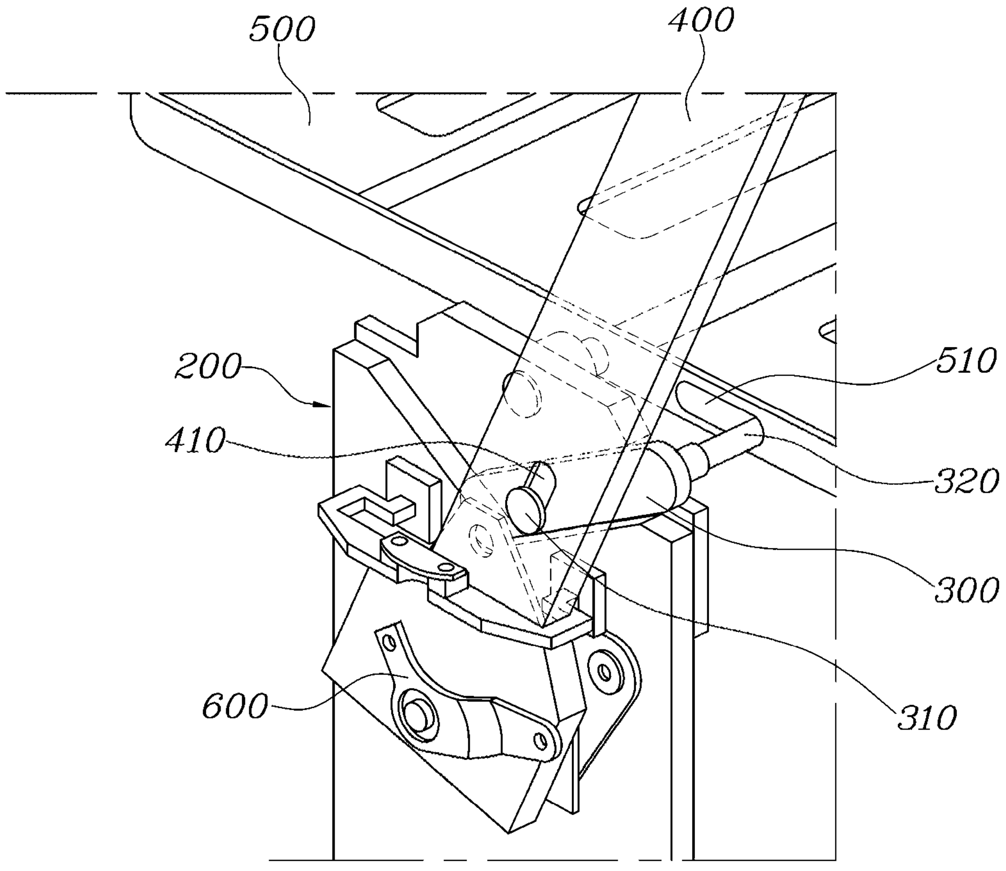
FIG. 14 is a view exemplarily illustrating a position of the link portion with respect to positions of the back frame and the cushion frame in FIG. 13.
Figure 15:
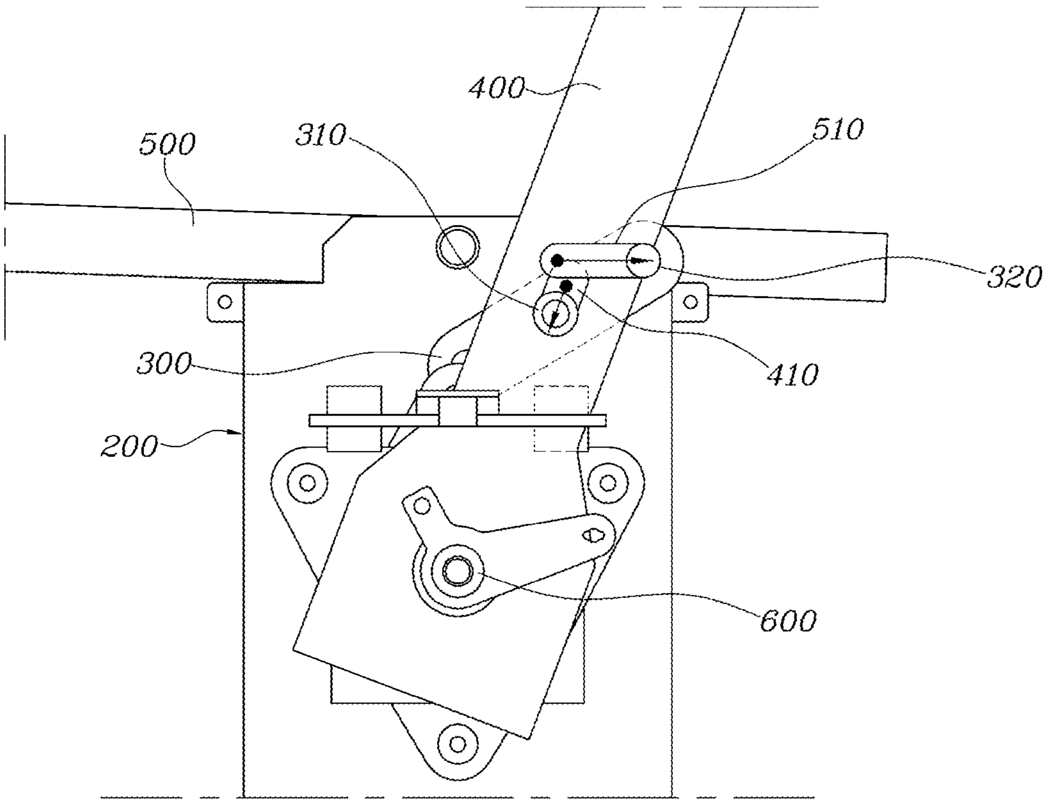
FIG. 15 is a side view exemplarily illustrating the position of the link portion with respect to the positions of the back frame and the cushion frame in FIG. 13.

Furthermore, when the back frame 400 rotates in another direction as illustrated in FIG. 13, the first connection portion 310, which is the protrusion, moves downwardly in the opposite direction in the first operation portion 410, which is the slit, in accordance with the rotation of the back frame 400, as illustrated in FIG. 14, and FIG. 15. At the same time, when the first connection portion 310 moves in the first operation portion 410, the link portion 300 rotates, and the second connection portion 320, which is the protrusion, moves in the opposite direction in the second operation portion 510, which is the slit so that the cushion frame 500 rotates.

As described above, according to an exemplary embodiment of the present disclosure, the link portion 300 rotates in accordance with the rotation direction of the back frame 400, and the cushion frame 500 rotates in conjunction with the link portion 300. Therefore, the back frame 400 and the cushion frame 500 are rotated in the opposite directions by the connection structure using the connection portion and the operation portion so that the seat posture is changed. Furthermore, the seating direction changes between the two directions in accordance with the rotation directions of the back frame 400 and the cushion frame 500 so that the convenience of use may be improved.

Figure 5:
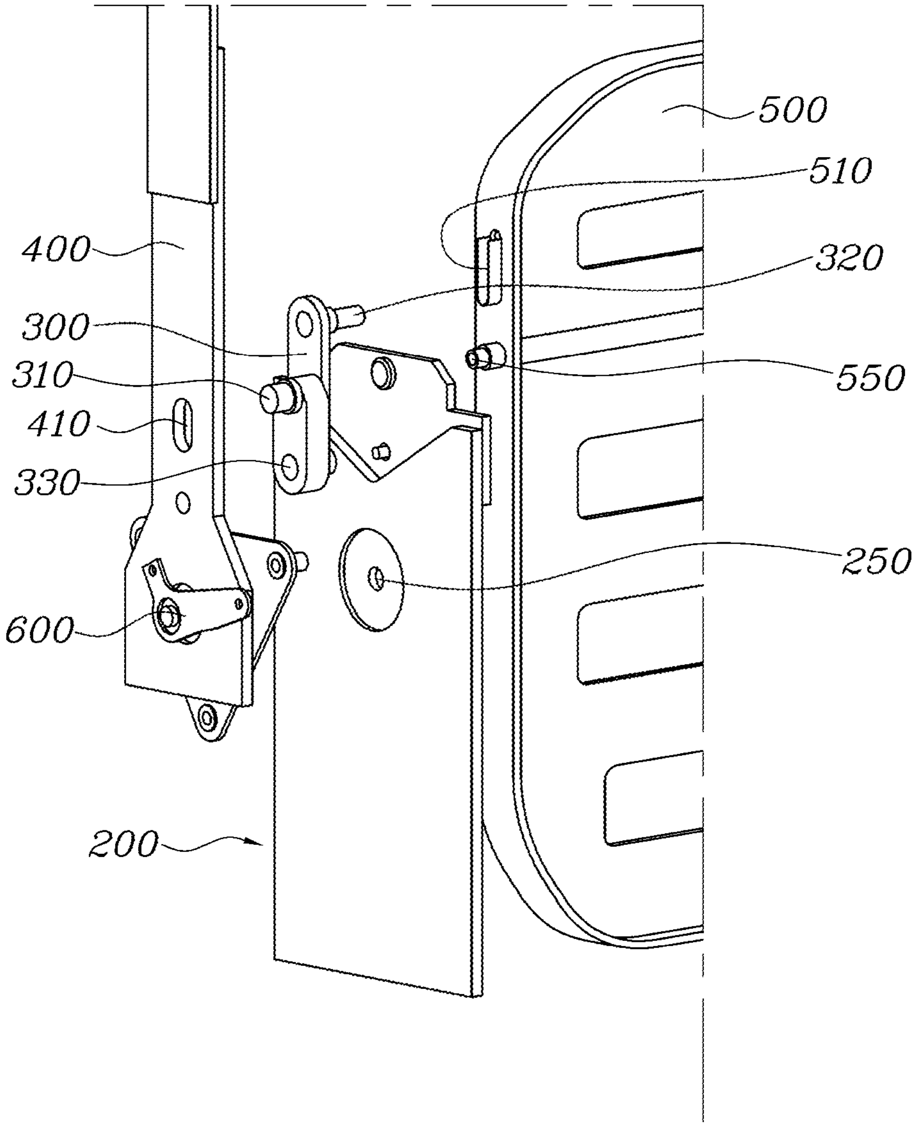
FIG. 5 is a mounted view of the seat for mobility illustrated in FIG. 1.
Figure 6:
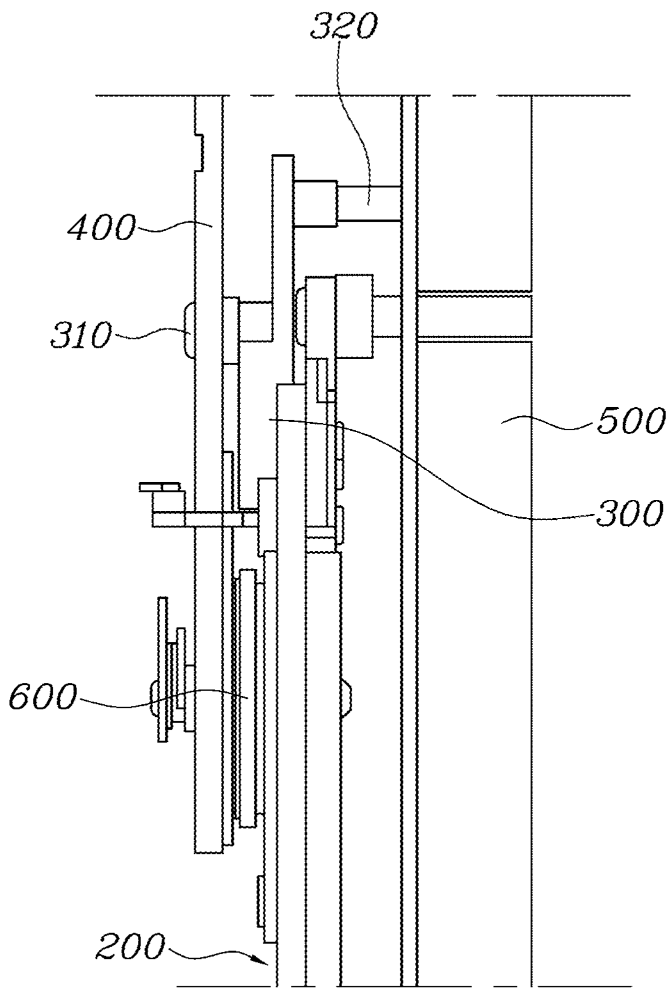
FIG. 6 is a cross-sectional view of the seat for mobility illustrated in FIG. 1.

Meanwhile, as may be seen from FIG. 5 and FIG. 6, the back frame 400 may be rotatably provided on the support portions 200 by recliners 600.

The recliner 600 includes functions of adjusting the tilting angle of the back frame 400 and locking the back frame 400, and the back frame 400 is provided on the support portions 200 by the recliners 600 so that the tilting angle of the back frame 400 may be adjusted and fixed.

The recliner 600 may include a housing, a locking plate coupled to a rotation shaft in the housing, a fixing portion configured to restrict a relative rotation between the locking plate and the housing, an elastic portion configured to apply an elastic force to the locking plate in a direction in which the fixing portion is caught and coupled, and a lever configured to release the fixing portion. The detailed structure of the recliner 600 may be applied as various embodiments.

In the instant case, a cable may be connected to the lever so that the occupant may directly manually perform the locking or unlocking operation. Alternatively, a motor may be connected so that the locking or unlocking operation may be automated.

Figure 16:
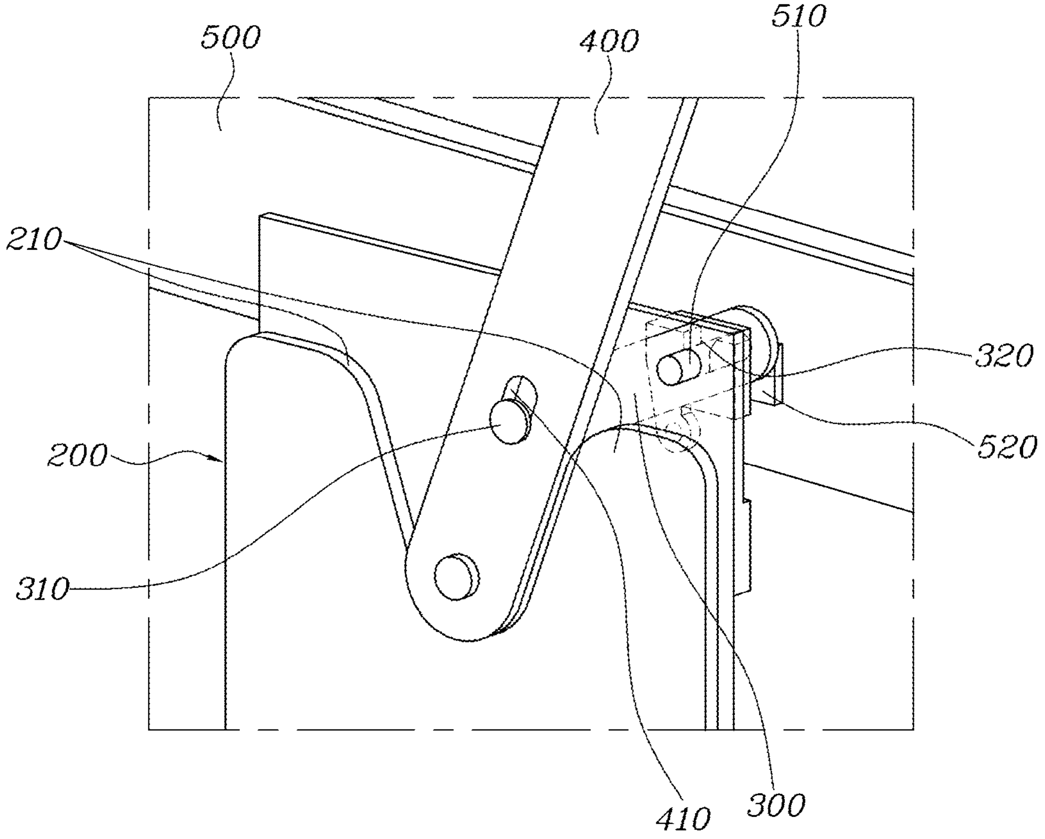
FIG. 16 is a view exemplarily illustrating an exemplary embodiment for fixing a position of the link portion in the seat for mobility according to an exemplary embodiment of the present disclosure.
Figure 17:
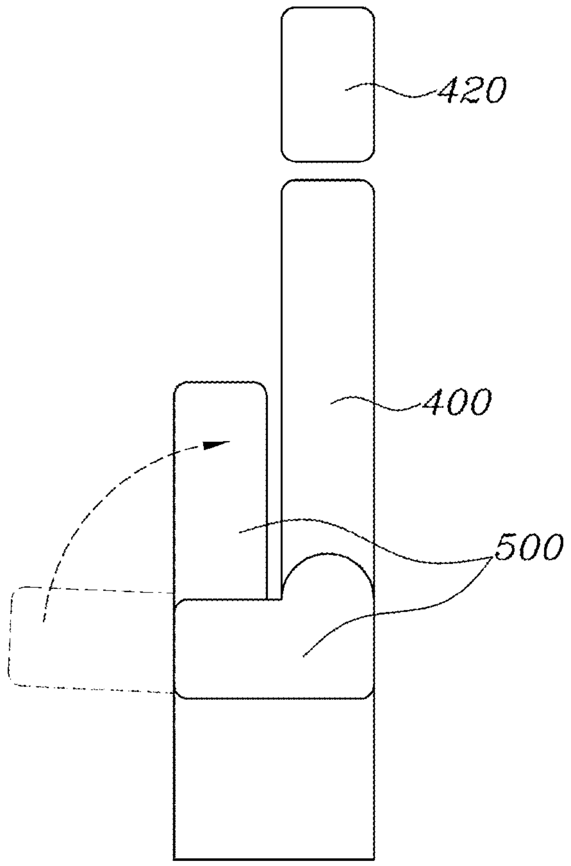
FIG. 17 is a view exemplarily illustrating another exemplary embodiment of the cushion frame in the seat for mobility according to an exemplary embodiment of the present disclosure.

Meanwhile, as illustrated in FIG. 16, stoppers 210 may be formed on the support portion 200 to restrict the rotation position of the link portion 300. The stopper 210 may be formed at a position at which the link portion 300 comes into contact with the stopper 210 when the cushion frame 500 rotates at a deployment angle at which the occupant may be seated on the cushion frame 500.

The stopper 210 is configured to regulate the rotation positions of the back frame 400 and the cushion frame 500. The stopper 210 may be formed in a wedge shape on the support portion 200. The stopper 210 may be brought into contact with and supported by the link portion 300 which is rotated when the back frame 400 and the cushion frame 500 are rotated in the state in which the occupant may be seated on the back frame 400 and the cushion frame 500.

Therefore, when the link portion 300 comes into contact with the stopper 210, the rotation of the link portion 300 is restricted, the position of the link portion 300 is fixed, and the positions of the back frame 400 and the cushion frame 500 are regulated so that the positions of the back frame 400 and the cushion frame 500 may be maintained so that the occupant may be seated on the back frame 400 and the cushion frame 500.

Furthermore, the link portion 300 may come into contact with the stopper 210 and implement the support structure so that the postures of the back frame 400 and the cushion frame 500 may be stabilized.

Meanwhile, as illustrated in FIG. 16, a latch 520 may be provided on the cushion frame 500, and the latch 520 may be provided to connect the link portion 300 when the cushion frame 500 rotates at a deployment angle at which the occupant may be seated on the cushion frame 500.

The latch 520 may be provided on the second operation portion 510 and are configured to regulate the rotation positions of the back frame 400 and the cushion frame 500.

FIG. 16 illustrates the exemplary embodiment in which the second connection portion 320 is configured as a groove, and the second operation portion 510 is configured as a protrusion.

In the instant case, the latch 520 is configured to fix the position of the link portion 300 when the link portion 300 is connected. The latch 520 is provided at a position at which the latch 520 may be connected to the link portion 300 when the link portion 300 rotates in conjunction with the rotation of the cushion frame 500 when the cushion frame 500 rotates in the state in which the occupant may be seated on the cushion frame 500. The latch 520 may be provided as a single latch 520 or a plurality of latches 520. According to an exemplary embodiment of the present disclosure, because the seating direction changes between the two directions, a pair of latches 520 may be configured based on the two directions.

Therefore, when the back frame 400 and the cushion frame 500 rotate and switch to the state in which the occupant may be seated on the back frame 400 and the cushion frame 500, the link portion 300 also rotates and moves to the position at which link portion 300 may be connected to the latch 520, and the link portion 300 is fixed by being connected to the latch 520 so that the positions of the back frame 400 and the cushion frame 500 may be regulated. Therefore, the positions of the back frame 400 and the cushion frame 500 may be maintained so that the occupant may be seated on the back frame 400 and the cushion frame 500.

Figure 2:
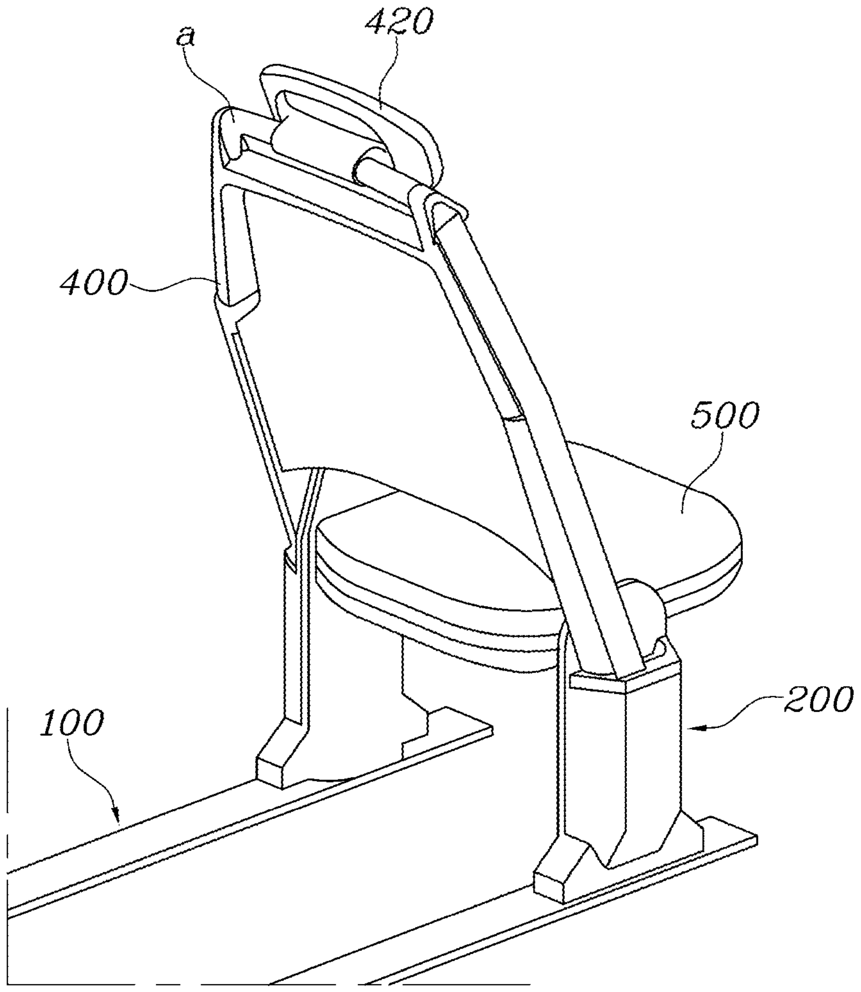
FIG. 2 is a view exemplarily illustrating a change in seating direction of the seat for mobility illustrated in FIG. 1.

Meanwhile, as may be seen from FIG. 1 and FIG. 2, a headrest 420 may be provided on an upper portion of the back frame 400, and the headrest 420 may be rotatably provided on the back frame 400.

To the present end, a fixing shaft a may be provided at an upper side of the back frame 400, and the headrest 420 may be rotatably engaged to the fixing shaft. When the headrest 420 rotates by 180° about the fixing shaft a, the position of the headrest may change between the two directions. The rotation angle of the headrest 420 may be set to various angles in accordance with the implementation of the seat.

Therefore, it is possible to stably support the occupant by changing the position of the headrest 420 in accordance with the change in seating direction by the back frame 400 and the cushion frame 500.

Meanwhile, the cushion frame 500 may be divided into a plurality of cushion frames 500. Any one cushion frame 500 may be provided on the support portion 200, and the remaining cushion frames 500 may be rotatably engaged to the cushion frame 500 provided on the support portion 200.

As described above, in the state in which the cushion frame 500 includes the plurality of cushion frames 500, the cushion frames 500 may be configured to be folded or unfolded. When the cushion frames 500 are folded, the accommodation space may be reduced. When the cushion frames 500 are unfolded, the occupant may be seated. Furthermore, it is possible to optimize the seating posture of the occupant by changing angles of the cushion frames 500.

According to the seat for mobility structured as described above, the seating direction of the seat may be changed so that the convenience of use of the seat may be ensured, the weight and volume may be reduced by structural simplification, and the manufacturing costs may be reduced.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In exemplary embodiments of the present disclosure, “at least one of A and B” may refer to “at least one of A or B” or “at least one of combinations of at least one of A and B”. Furthermore, “one or more of A and B” may refer to “one or more of A or B” or “one or more of combinations of one or more of A and B”.

In the present specification, unless stated otherwise, a singular expression includes a plural expression unless the context clearly indicates otherwise.

In the exemplary embodiment of the present disclosure, it should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat for mobility, the seat comprising:
guide rails provided on a floor surface of the mobility;
support portions movably mounted on the guide rails;
link portions rotatably connected to the support portions and including first connection portions and second connection portions spaced apart from a rotation center;
a back frame tiltably mounted on the support portions and including first operation portions to which the first connection portions of the link portions are rotatably engaged; and
a cushion frame rotatably mounted on the support portions and including second operation portions to which the second connection portions of the link portions are rotatably engaged, the cushion frame being configured to be rotated by the link portions in conjunction with a tilting operation of the back frame,
wherein the first connection portions are spaced from the rotation center by a first predetermined distance and the second connection portions are spaced from the rotation center by a second predetermined distance, and
wherein the second predetermined distance is longer than the first predetermined distance.

2. The seat of claim 1, wherein the back frame is disposed on external surfaces of the support portions, the cushion frame is disposed on internal surfaces of the support portions, the link portions are provided on the external surfaces of the support portions, the first connection portions extend outward and are engaged to the first operation portions of the back frame, and the second connection portions extend inward and are engaged to the second operation portions of the cushion frame.

3. The seat of claim 2, wherein a lower portion of the back frame is rotatably mounted on the support portions and disposed below the link portions, and the first operation portions are spaced apart from a point at which the back frame is mounted on the support portions.

4. The seat of claim 2, wherein a point at which the cushion frame is mounted on the support portions are disposed to be biased toward any one side in a longitudinal direction, and the second operation portions are spaced apart from the point, at which the cushion frame is mounted on the support portions, in a direction in which a length of a seat frame is short, based on the point at which the cushion frame is mounted on the support portions as the point at which the cushion frame is mounted on the support portions are biased.

5. The seat of claim 1, wherein the first connection portions, and the second connection portions portions are configured as protrusions, the first operation portions and the second operation portions are configured as slits, and the protrusions and the slits define insertion structures.

6. The seat of claim 5, wherein each of the slits related to the first operation portions and the second operation portions extends to define a movement route of a corresponding one of the protrusions.

7. The seat of claim 1, wherein the back frame is rotatably mounted on the support portions by a recliner.

8. The seat of claim 1, wherein the support portions include a stopper to restrict a rotation position of the link portions, and the stopper is formed at a position at which the stopper comes into contact with the link portions in response that the cushion frame rotates at a deployment angle at which an occupant is seated.

9. The seat of claim 1, wherein a latch is mounted on the cushion frame, and the latch is provided to be connected to the link portions in response that the cushion frame rotates at a deployment angle at which an occupant is seated.

10. The seat of claim 1, wherein a headrest is mounted on an upper portion of the back frame, and the headrest is rotatably mounted on the back frame.

11. The seat of claim 1, further comprising at least a rotatable cushion frame rotatably engaged to a first end portion of the cushion frame mounted on the support portions.

12. A seat for mobility, the seat comprising:
guide rails provided on a floor surface of the mobility;
support portions movably mounted on the guide rails;
link portions rotatably connected to the support portions and including first connection portions and second connection portions spaced apart from a rotation center;
a back frame tiltably mounted on the support portions and including first operation portions to which the first connection portions of the link portions are rotatably engaged; and
a cushion frame rotatably mounted on the support portions and including second operation portions to which the second connection portions of the link portions are rotatably engaged, the cushion frame being configured to be rotated by the link portions in conjunction with a tilting operation of the back frame,
wherein the first connection portions and the second connection portions are configured as protrusions, the first operation portions and the second operation portions are configured as slits, and the protrusions and the slits define insertion structures, and
wherein in the slits related the first operation portions, and the second operation portions, in a state in which the back frame and the cushion frame are rotated on lines perpendicular to an upward/downward direction, the protrusions of the first connection portions are positioned at uppermost end portions of the slits, and the protrusions of the second connection portions and the second operation portions are positioned at lowermost end portions of the slits.

13. A seat for mobility, the seat comprising:
guide rails provided on a floor surface of the mobility;
support portions movably mounted on the guide rails;
link portions rotatably connected to the support portions and including first connection portions and second connection portions spaced apart from a rotation center;
a back frame tiltably mounted on the support portions and including first operation portions to which the first connection portions of the link portions are rotatably engaged; and
a cushion frame rotatably mounted on the support portions and including second operation portions to which the second connection portions of the link portions are rotatably engaged, the cushion frame being configured to be rotated by the link portions in conjunction with a tilting operation of the back frame,
wherein the first connection portions and the second connection portions are configured as protrusions, the first operation portions and the second operation portions are configured as slits, and the protrusions and the slits define insertion structures, and
wherein a first end portion of the link portions is rotatably mounted on the support portions, the first connection portions and the second connection portions are sequentially spaced apart from each other toward a second end portion opposite to the first end portion, a length of the slit of each of the first operation portions are shorter than a length of the slit of each of the second operation portions so that a rotation amount of the cushion frame is greater than a tilting amount of the back frame.

14. The seat of claim 13, wherein the first end portion of the link portions is the rotation center.

* * * * *